Figure 1:
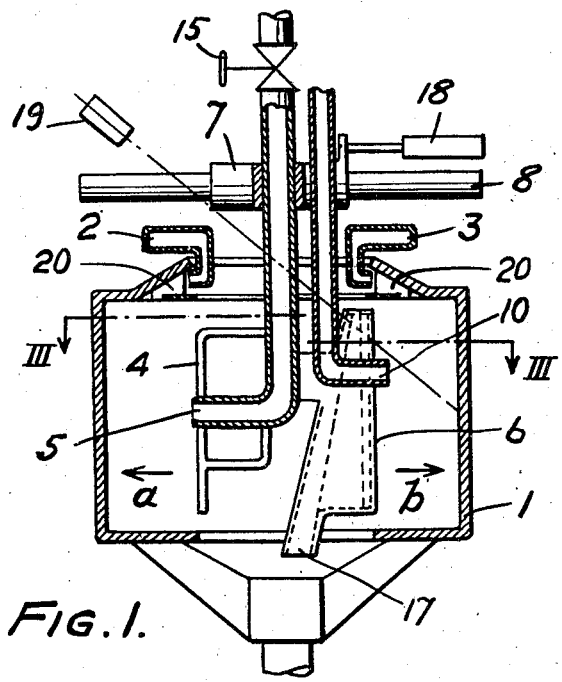

June 15, 1948.    C. G. ECKERS    2,443,310
METHOD AND APPARATUS FOR THE PRODUCTION OF STARCH
Filed July 22, 1944    2 Sheets-Sheet 1

WITNESS:

INVENTOR
Carl Göran Eckers
BY
ATTORNEYS.

June 15, 1948.  C. G. ECKERS  2,443,310
METHOD AND APPARATUS FOR THE PRODUCTION OF STARCH
Filed July 22, 1944  2 Sheets-Sheet 2

INVENTOR
Carl Gören Eckers
BY
Busser and Harding
ATTORNEYS.

WITNESS:

Patented June 15, 1948

2,443,310

UNITED STATES PATENT OFFICE 2,443,310

METHOD AND APPARATUS FOR THE PRODUCTION OF STARCH

Carl Göran Eckers, Stockholm, Sweden, assignor to Aktiebolaget Separator, Stockholm, Sweden, a corporation of Sweden Application July 22, 1944, Serial No. 546,184
In Sweden July 27, 1943

18 Claims. (Cl. 127—69)

In the production of starch from potatoes and similar raw-material, this is usually grated to a mass, which is diluted with water and subjected to a sifting operation in which the coarsest cellulose particles, called pulp, are removed. Mixed with the starch granules some solid impurities in the form of starch slush, small cellulose fibres, etc., are still to be found, which in the ensuing description will be referred to as solid impurities. The starch and the solid impurities are suspended in a fruit water, diluted by the water added. Disregarding the dilution, this liquid will below be referred to as fruit water. It is important that the starch is removed from the fruit water as quickly as possible. Further, the purified starch must contain only very small amounts of starch slush and fibres.

The object of my invention is partly a method of liberating the starch from the starch slush, fibres, and fruit water by centrifuging the starch milk in a whole wall centrifugal drum, and partly an apparatus for carrying out the method. My process is substantially characterized in that the layer of starch slush and fibres, formed during the centrifuging inside the layer of starch, is periodically scraped off and removed from the bowl, whereafter the starch is also periodically removed.

It is thereby important that the starch milk to be centrifuged is of the right concentration, and that the centrifuging is carried out at a rotation speed determined in relation to the diameter of the bowl. Good results have been obtained with a starch milk having a concentration of 10 to 13° Bé., and as an example of a suitable rotation speed it may be mentioned that I have found that a centrifugal bowl having an interior diameter of 300 mms. should rotate at a speed of about 1000 revolutions per minute, the starch slush and fibres thereby with certainty being separated as a layer on the inner surface of the purified starch, whereas at a rotation speed of for instance 1600 revolutions per minute a considerable amount of fibres may become embedded in the layer of starch.

I have found that relatively small changes in the most favourable dimensions may cause the mass to be divided into layers, so that, although a considerable proportion of the fibres are separated as a layer inside the starch, other layers of fibres may become embedded in and follow the starch. I have also found that the risk of this undesirable separation of the mass into mixed layers is reduced, if the starch milk fed into the bowl has been concentrated. The higher the concentration, the less the risk of layers being formed. It should, however, be noted that the concentration must not be pushed too far, because the inner friction would then become so high that the fibres could not move relative to the starch in the centrifuge. It is on the other hand desirable to push the concentration so far that the specific gravity of the starch milk becomes higher than that of the fibres. The concentration may advantageously be effected in continuous operation centrifuges, cyclones, or the like.

When carrying out the process, the starch milk may be fed into the drum in portions, advantageously each time a quantity corresponding to the volume of the drum. When centrifuged the mixture will divide into three concentric layers, starch close to the drum wall, starch slush and fibres inside this, and fruit water nearest the center. If so fed, the treatment of each portion in the drum should be completed and the whole quantity, or at least the majority thereof, should be removed from the drum before the next portion is fed into it. Or, after the drum has been filled with starch milk, the supply thereof into the drum and the discharge of fruit water therefrom may go on continuously during a given period, whereupon starch slush, fibres, and starch are removed in the manner above indicated.

The separated fruit water may either be discharged from the drum together with the starch slush and fibres, advantageously by means of the same tool, or in a separate operation before the starch slush and the fibres are discharged. In the latter case the same tool may be used both for the fruit water and the starch slush and fibres. The fruit water may then be conducted off thru a separate pipe line. It may also be discharged by means of a paring device, and the starch slush and fibres by means of a surface scraper.

The starch may also be removed by means of a surface scraper, which may be the same as the one used for the starch slush and the fibres, but in that case the scraper should of course be washed off before the starch is discharged. It will be understood that separate discharge pipes will have to be provided unless provision is made to flush out the pipe, also.

It has proved advantageous, however, to remove the starch from the drum by paring after it has again been suspended in water. This is done by filling the drum with water, whereupon its contents are mixed by a stirrer, the surface scraper possibly being used for the purpose.

The method described enables an efficient post-washing of the starch in the centrifugal drum, since it is possible to separate the starch again and to discharge the water, instead of immediately removing the starch after it has been suspended. If desirable, such mixing with water and subsequent discharging thereof may be carried out several times before the starch is finally removed from the drum. It will be understood that the starch may instead be subjected to a following washing in rotary filters, drying centrifuges, or the like.

The process also includes steps to change, after the drum has been filled with liquid, the relative speed in tangential direction between the layer at the free (inner) surface of the material contained in the drum and the layers situated farther out in the drum, which has proved to be of importance in connection with the separation of starch because the formation of so-called waves in the drum and vibrations resulting therefrom are then avoided. The said relative speed may be changed by spraying liquid at the free surface in the drum, for instance along a line covering the whole axial length of the surface. The liquid may be sprayed continuously during the whole period of centrifuging or only during a part thereof. If, in the latter case, the water is sprayed on for instance when the fibres are being scraped off, the surface of the fibre-layer is loosened and the scraping is facilitated.

By means of a non-rotative member trailing on the free surface the formation of waves in the drum may in corresponding manner be avoided and a loosening of the separated material be attained.

Figure 2:
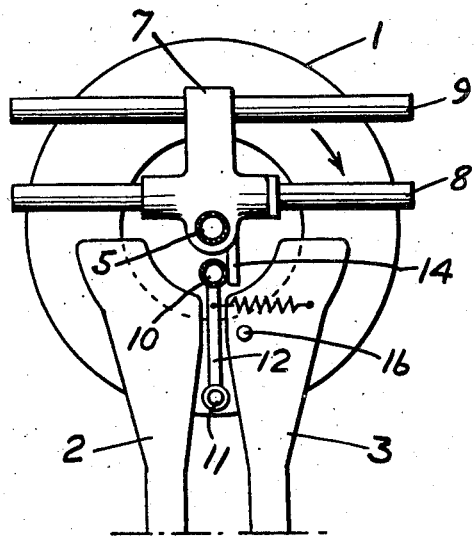
Figure 3:
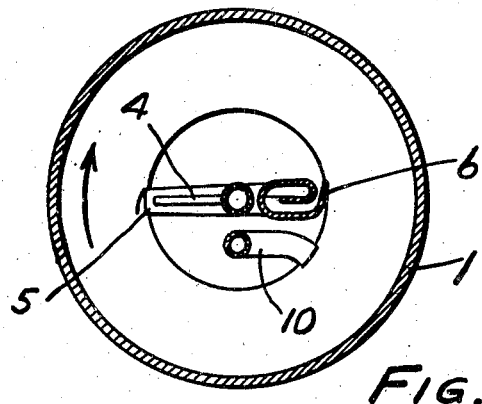
Figure 4:
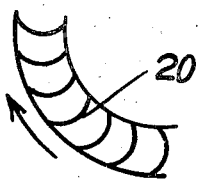
Figure 5:
Figure 6:

The accompanying drawings show by way of example one arrangement for carrying out the process described above. Fig. 1 is a vertical sectional diagrammatic view of the centrifugal drum, with the paring device 10, shifted from its position shown in Figures 2 and 3, Fig. 2 a plan view thereof, and Fig. 3 a horizontal sectional view on the line III—III of Fig. 1. Figs. 4, 5, and 6 show some embodiments of conveyer wings in the inlet part of the drum.

1 is the centrifugal drum, which is provided with two inlet pipes 2 and 3, the one for the supply of starch milk and the other for the supply of suspension- or wash-water. A stirrer 4, a parer 5 for purified starch and a surface scraper 6 form together a double-sided tool, carried by a holder 7 adjustably arranged on two guide-bars 8 and 9. A separate or auxiliary paring device 10 is arranged on an arm 12, swingable about a vertical shaft 11, and kept pressed on a nose 14 of the holder 7 by a spring 13. 15 is a valve on the paring device 5.

The arrangement operates in the following manner. The drum is filled with starch milk thru the pipe 2, the tools 4, 5, and 6 during this time occupying their middle position as illustrated in Fig. 1. The double-sided tool is then immediately moved in the direction indicated by the arrow $a$, the stirrer 4 thereby entering into operation. The valve 15 is kept closed. After the stirring has been completed, the stirrer is brought back into its middle position for some minutes, or the time required for the centrifugal force to cause the desired separation into three concentric layers, starch next to the drum wall, starch slush and fibres next to the starch and fruit water nearest the center. After the separation is completed the tool is pushed over in the direction of the arrow $b$. Owing to the relative positions of the tools, the paring device 10 at first moves ahead of the surface scraper 6 and conducts off the fruit water collected closest to the centre. In a given position the movement of the paring device 10 (which should then have reached the outer surface of the fruit water) is stopped by a projection 16. If the double-sided tool is still pushed on in the same direction, the surface scraper 6 will move past the paring device 10 and will scrape off and discharge through the downwardly extending outlet 17 the layer which was situated outside the fruit water and consists of fibres and starch slush. There is then left in the bowl only the purified starch, which could of course also be scraped off by means of the scraper 6, but it has proven better to instead return the members 4, 5, and 6 to their middle position, and then to fill the drum with pure water thru the inlet pipe 3, to stir the contents by the tool 4, and first pare out a major portion of the water and impurities contained therein with the scraper 6 and finally to open the valve 15 and to pare out the starch together with the remaining water by the tool 5. It will be understood that the previous operations may, as stated above, be repeated, that is the starch may be washed several times before it is finally discharged by means of the paring device 5.

The movement of the double-sided tool along the guide bars may be obtained in many different manners. In Fig. 1 the part numbered 18 indicates a device for hydraulic drive. The movement may also take place automatically according to various methods, for instance by using hydraulic or electro-magnetic time relays. In Fig. 1 number 19 indicates a photo-cell, arranged to be influenced by the white starch and in turn to control the movement of the surface scraper 6 in the direction of the arrow $b$ in such a manner that the movement ceases as soon as fibres and starch slush have been scraped off. By using a supply tank for the starch milk and providing it with a device for regulating the concentration of the starch milk, the surface scraper may instead be arranged to be fed out to a given level in the bowl when the fibres are being scraped off. The double-sided tool may finally be connected in such a manner to valves arranged in the supply and discharge pipes of the centrifuge as to ensure automatic supply of starch milk and wash water and automatic discharge of starch.

I have found it to be of importance for the separating of the fibres that the slipping (i. e. rotation of the liquid relative to the bowl) of the liquid fed into the bowl has the right value. With the arrangement under consideration this is attained by providing conveyer or delivery wings 20 in the inlet of the bowl. By using wings of different shapes, that is forward-bent as in Fig. 4, radial as in Fig. 5, or backward-bent as in Fig. 6 at their outlet edge, the correct slipping may be obtained in every particular case.

The operation of the centrifuge may be rendered further automatic by providing tanks for starch milk and wash water, advantageously placed above the centrifuge, and containing fixed quantities of liquid, which are fed into the centrifuge (possibly at given times) by means of a releaser device.

In view of the intermittent character of the centrifugal treatment it is advisable to use centrifuges having a considerable swinging mass; if necessary the machine may for instance be provided with a fly-wheel.

What I claim and desire to protect by Letters Patent is:

1. An apparatus for liberating starch from starch slush, fibres, and fruit water, comprising a centrifugal drum provided with a stirrer, a parer for pure starch, and a surface scraper, which tools are built together to a double-sided tool in such a manner that, by displacing the tool in one of two opposite directions from a middle position, one of the three single tools is put into operation and by displacing in the other direction, another of the tools is put in operation.

2. An apparatus for liberating starch from starch slush, fibres, and fruit water, comprising a centrifugal drum provided with a stirrer, a parer for pure starch, and a surface scraper, which tools are built together to a double-sided tool in such a manner that the stirrer and the parer enter into operation when the double-sided tool is displaced in the one direction, and that the surface scraper enters into operation when the double-sided tool is displaced in the other direction from its middle position.

3. An apparatus for liberating starch from starch slush, fibres, and fruit water, comprising a centrifugal drum, a radially movable carrier arranged to be moved to opposite sides of the center of the drum, a parer for pure starch and a surface scraper mounted on the carrier, the arrangement being such that when the carrier is moved in one direction the parer will be placed in operative position and when moved in the opposite direction the scraper will be placed in operative position.

4. An apparatus for liberating starch from starch slush, fibres, and fruit water, comprising a centrifugal drum, a radially movable carrier arranged to be moved to opposite sides of the center of the drum, a stirrer, a parer for pure starch and a surface scraper mounted on the carrier, the arrangement being such that when the carrier is moved in one direction the stirrer and the parer will be placed in operative positions and when moved in the opposite direction the scraper will be placed in operative position.

5. An apparatus for liberating starch from starch slush, fibres, and fruit water comprising a centrifugal drum, a radially movable carrier arranged to be moved to opposite sides of the center of the drum, a parer for pure starch, an offtake pipe connected to the parer, a shut-off valve in the offtake pipe, and a surface scraper mounted on the carrier, the arrangement being such that when the carrier is moved in one direction the parer will be placed in operative position and when moved in the opposite direction the scraper will be placed in operative position.

6. An apparatus for liberating starch from starch slush, fibres, and fruit water, comprising a centrifugal drum, a radially movable carrier arranged to be moved to opposite sides of the center of the drum, a parer for pure starch and a surface scraper mounted on the carrier, the arrangement being such than when the carrier is moved in one direction the parer will be placed in operative position and when moved in the opposite direction the scraper will be placed in operative position and means for shifting the carrier.

7. An apparatus for liberating starch from starch slush, fibres, and fruit water, comprising a centrifugal drum, a radially movable carrier arranged to be moved to opposite sides of the center of the drum, a parer for pure starch and a surface scraper mounted on the carrier, the arrangement being such that when the carrier is moved in one direction the parer will be placed in operative position and when moved in the opposite direction the scraper will be placed in operative position, and hydraulic means for shifting the carrier.

8. An apparatus for liberating starch from starch slush, fibres, and fruit water, comprising a centrifugal drum, means for delivering starch slush to the drum; a radially movable carrier arranged to be moved to opposite sides of the center of the drum, a parer for pure starch and a surface scraper mounted on the carrier, the arrangement being such that when the carrier is moved in one direction the parer will be placed in operative position and when moved in the opposite direction the scraper will be placed in operative position.

9. An apparatus for liberating starch from starch slush, fibres, and fruit water, comprising a centrifugal drum, means for delivering starch slush to the drum, separate means for delivering wash water to the drum, a radially movable carrier arranged to be moved to opposite sides of the center of the drum, a parer for pure starch and a surface scraper mounted on the carrier, the arrangement being such that when the carrier is moved in one direction the parer will be placed in operative position and when moved in the opposite direction the scraper will be placed in operative position.

10. An apparatus for liberating starch from starch slush, fibres, and fruit water, comprising a centrifugal drum, delivery wings in the drum, means for delivering starch slush to said wings, separate means for delivering wash water to said wings, a radially movable carrier arranged to be moved to opposite sides of the center of the drum, a parer for pure starch and a surface scraper mounted on the carrier, the arrangement being such that when the carrier is moved in one direction the parer will be placed in operative position and when moved in the opposite direction the scraper will be placed in operative position.

11. An apparatus for liberating starch from starch slush, fibres, and fruit water, comprising a centrifugal drum, a radially movable carrier arranged to be moved to opposite sides of the center of the drum, a stirrer, a parer for pure starch and a surface scraper mounted on the carrier, the arrangement being such that when the carrier is moved in one direction the stirrer and parer will be placed in operative position and when moved in the opposite direction the scraper will be placed in operative position, an auxiliary paring device for the fruit water in advance of the scraper and mounted for movement independent thereof, means for moving the auxiliary parer into operative position when the scraper is moved toward its operative position, a stop for limiting the movement of the auxiliary parer, to permit the scraper to be moved beyond the auxiliary parer, and means on the carrier for returning the auxiliary parer to its inoperative position.

12. An apparatus for liberating starch from starch slush, fibres, and fruit water, comprising a centrifugal drum, a radially movable carrier arranged to be moved to opposite sides of the center of the drum, a stirrer, a parer for pure starch and a surface scraper mounted on the carrier, the arrangement being such that when the carrier is moved in one direction the stirrer and parer will be placed in operative position and when moved in the opposite direction the scraper will be placed in operative position, an auxiliary paring device for the fruit water in advance of the scraper and mounted for movement independently thereof, spring means for moving the auxiliary parer into operative position when the scraper is moved toward its operative position, a stop for limiting the movement of the auxiliary parer, to permit the scraper to be moved beyond the auxiliary parer, and means on the carrier for returning the auxiliary parer to its inoperative position.

13. The method of liberating starch from starch milk containing fibres and fruit water, which comprises forming a whirling annulus of the milk in a locus of centrifugal force and there separating the annulus into an outer layer of relatively pure starch, an inner concentric layer of water and an intermediate concentric layer of fibres containing slush, removing said water and slush layers from the locus while continuing the application of centrifugal force to the starch, feeding water into the locus against the whirling annulus of starch remaining in the locus and mixing by stirring the water with the starch under the influence of centrifugal force, and then while still stirring the whirling annulus removing the starch and water by paring.

14. The method as defined in claim 13 comprising also the step of concentrating the starch milk, prior to forming said annulus, to a concentration of more than 10° Bé.

15. The method of liberating starch from starch milk containing fibres and fruit water, which comprises forming a whirling annulus of the milk in a locus of centrifugal force and there separating the annulus into an outer layer of relatively pure starch, an inner concentric layer of water and an intermediate concentric layer of fibres containing slush, removing said water and slush layers from the locus while continuing the application of centrifugal force to the starch, feeding water into the locus against the whirling annulus of starch remaining in the locus, mixing by stirring the water with the starch to wash the starch under the influence of centrifugal force, centrifugally separating the starch and wash water into an outer layer of starch and an inner annular layer of wash water containing impurities washed from the starch, separately removing said inner layer from said locus and then again feeding water into the locus against the whirling annulus of starch remaining in the locus, mixing by stirring the water with the starch under the influence of centrifugal force and removing by paring the suspension of starch and water, while continuing the stirring.

16. The method as defined in claim 15, comprising also the step of concentrating the starch milk, prior to forming said annulus, to a concentration of more than 10° Bé.

17. The method as defined in claim 15, in which said slush layer is removed from the whirling annulus of starch through one end of the free cylindrical space within said annulus, and the washed and separated starch is removed from the locus in a direction opposite to the direction of said removal of the slush.

18. The method as defined in claim 15, in which said removal of the slush layer is effected by scraping the same from the whirling annulus of starch and discharging the scraped slush through the lower end of the free cylindrical space within said annulus.

CARL GÖRAN ECKERS.

REFERENCES CITED

The following references are of record in the file of this patent:

UNITED STATES PATENTS

| Number | Name | Date |
| --- | --- | --- |
| 406,559 | Behr | July 9, 1889 |
| 594,255 | Kahn | Nov. 23, 1897 |
| 757,778 | Schrader | Apr. 19, 1904 |
| 1,117,195 | Kopke | Nov. 17, 1914 |
| 1,681,118 | Jaschke | Aug. 14, 1928 |
| 1,923,455 | Peltzer | Aug. 22, 1933 |
| 2,154,134 | Millar | Apr. 11, 1939 |
| 2,324,850 | Kelling | July 20, 1943 |

OTHER REFERENCES

Rehwald—Starch-Making, page 66, London, 1926. (Copy in Div. 43.)

Brautlecht—"Mfg. of White Potato Starch in the U. S.," Ind. & Eng. Chem., July 1940, page 897.

Rehwald—"Starch Making," London 1926, pages 65, 66, 128, 129 and 179. (Copy in Div. 43.)

Radley—"Starch and Its Derivatives," N. Y., 1944, pages 155, 156 and 170. (Copy in Div. 43.)